US010079025B2

(12) United States Patent
Rolland et al.

(10) Patent No.: US 10,079,025 B2
(45) Date of Patent: Sep. 18, 2018

(54) METHOD FOR PROJECTED REGULARIZATION OF AUDIO DATA (71) Applicant: STEINBERG MEDIA TECHNOLOGIES GMBH, Hamburg (DE)

(72) Inventors: Jean-Baptiste Jacques Guillaume Rolland, Hamburg (DE); Yvan Grabit, Bargteheide (DE)

(73) Assignee: Steinberg Media Technologies GmbH, Hamburg (DE)

( * ) Notice: Subject to any disclaimer, the term of this patent is extended or adjusted under 35 U.S.C. 154(b) by 0 days.

(21) Appl. No.: 15/296,706

(22) Filed: Oct. 18, 2016

(65) Prior Publication Data
US 2018/0018979 A1    Jan. 18, 2018

(30) Foreign Application Priority Data

Jul. 14, 2016    (EP) .................................. 16179412

(51) Int. Cl.
G10L 19/00    (2013.01)
G10L 19/02    (2013.01)
(52) U.S. Cl.
CPC ................................ G10L 19/0212 (2013.01)
(58) Field of Classification Search
CPC ...................................................... G10L 19/00
USPC ..................... 704/500, 226; 381/66; 386/245
See application file for complete search history.

(56) References Cited

U.S. PATENT DOCUMENTS 8,442,262 B2    5/2013  Sim et al.
9,104,271 B1*   8/2015  Adams .................. G06F 3/0426
9,570,057 B2*   2/2017  Brown ..................... G10H 1/125
9,646,184 B2*   5/2017  Jiang .................. G06K 7/10128
9,712,738 B2*   7/2017  Van Heugten ..... H04N 5/23212
9,720,515 B2*   8/2017  Wagner .................... G06F 3/017
9,779,736 B2*  10/2017  Lowe ...................... H04H 60/04
9,891,718 B2*   2/2018  Connor .................... G06F 3/017
2003/0118245 A1*  6/2003  Yaroslavsky .......... G06T 1/0007
                                                          382/255
2005/0228660 A1* 10/2005  Schweng ................ G10L 21/02
                                                          704/226

(Continued)

FOREIGN PATENT DOCUMENTS

KR    100663379    12/2006

OTHER PUBLICATIONS

Tschumperlé et al., "Vector-Valued Image Regularization with PDE's: A Common Framework for Different Applications", Diss. INRIA, 2002.

(Continued)

Primary Examiner — Michael Colucci
(74) Attorney, Agent, or Firm — Sand & Sebolt (57) ABSTRACT A method of modification of audio data to improve the quality of the audio modification or reconstruction or improves the speed of such reconstruction or modification and produces more realistic audio data. Realistic audio data is audio data that is generated in natural events like talking or singing or a vehicle passing by and is not generated only by artificially constructing audio data like in a synthesizer. This will lead to audio data that will be perceived more likely as natural or unmodified audio signal when being played back to human beings. The method involves modification of some part of transformed audio data, especially phase data.

18 Claims, 3 Drawing Sheets (56) References Cited

U.S. PATENT DOCUMENTS

| | | | | |
|---|---|---|---|---|
| 2011/0268424 A1* | 11/2011 | Holland | ............... | G11B 27/036 |
| | | | | 386/245 |
| 2012/0062784 A1* | 3/2012 | Van Heugten | ....... | H04N 5/2254 |
| | | | | 348/340 |
| 2015/0023345 A1 | 1/2015 | Schechner et al. | | |
| 2015/0030171 A1* | 1/2015 | Hashimoto | .............. | H04R 3/04 |
| | | | | 381/66 |
| 2015/0221313 A1* | 8/2015 | Purnhagen | ............ | G10L 19/008 |
| | | | | 704/500 |
| 2016/0049155 A1* | 2/2016 | Siemes | ................... | G10L 19/02 |
| | | | | 704/500 |

OTHER PUBLICATIONS

Christian Schörkhuber et al., "Constant-Q Transform Toolbox for Music Processing", 7th Sound and Music Computing Conference, Barcelona, Spain. 2010.

Amir Adler et al., "Audio Inpainting", IEEE Transactions on Audio, Speech, and Language Processing 20.3 (2012): 922-932.

Kimmel et al., "Images as Embedded Maps and Minimal Surfaces: Movies, Color, Texture, and Volumetric Medical Images", International Journal of Computer Vision 39.2 (2000): 111-129.

Sturmel et al., "Signal Reconstruction From STFT Magnitude: A State of the Art", International Conference on Digital Audio Effects (DAFx). 2011.

\* cited by examiner

METHOD FOR PROJECTED REGULARIZATION OF AUDIO DATA

BACKGROUND

Technical Field

This invention concerns the modification, especially correction, of audio data.

Background Information

For modifying or correcting audio data many methods are known in the state-of-the-art. To modify or correct audio data it is well known to transform the audio data from the time domain to a frequency-time domain using for example short-term Fourier transformation. After modification of the transformed audio data the result is transformed back to the time domain, especially using an inverse of the transform used to transform the time domain audio data to the frequency-time domain.

Such audio processing includes cleaning the audio signal from artefacts or reconstructing missing audio data. For example, it is known to recover missing phase information as disclosed in Nicolas Sturmel, Laurent Daudet, "signal reconstruction from as SIFT magnitude: a state of the art" in Proc. of the 14$^{th}$ International conference on Digital audio effects, Paris, France, Sep. 19-23, 2011.

In a different field of technology, picture reconstruction and improvement is known, for example from R. Kimmel, R. Malladi, N. Sochen, "Images Embedded to Maps and Minimal Surfaces: Movies, Colour, Texture and Volumetric Medical Images" in International Journal of computer vision 39(2), 111-129, 2000 or D. Tschumperlé, R. Derich, "Vector-Valued Image Regularization with PDE's: a Common Framework for Different Applications" in IEEE Transactions on Pattern Analysis and Machine Intelligence (Volume: 27, Issue: 4).

It is further known to use special algorithms used for image in-painting, to reconstruct audio data using dictionaries as in Amir Adler et al., "Audio Inpainting" in IEEE Transactions on Audio, Speech, and Language Processing (Volume: 20, Issue: 3).

Many of the known modifications or reconstructions use an iterative process wherein the data is modified step-by-step, normally implemented by some kind of loop. The loop then includes some modification steps which are applied several times during several loop passes, e.g. once every loop pass.

SUMMARY

The object of the invention at hand is to improve the quality and/or the speed of the audio modification or reconstruction.

This is achieved by an inventive modification of some part of the transformed audio data, especially phase data, not necessarily at each pass of the loop used to modify the audio data but at least in every fifth pass of the loop. This, quite simple operation, regarding the phase data, ensures a much higher quality of the modified audio data. Much higher quality especially provides more realistic or more natural audio data. Realistic audio data is such audio data that is generated in natural events like talking or singing people or some vehicle passing by and not generated only by artificially constructing audio data like in a synthesizer. The invention leads to modified (computed) audio data that will be perceived more likely as a natural or unmodified or realistic audio signal when being played back to human beings.

With this approach of the invention many different methods to modify audio data can be used or combined. They just need to work in an iterative way or by repeating some given kind of modification or applying some modification several times whereby the modification does not have to be the same during the different steps or iterations or loop passes. Normally the steps of modification applied one after the other will have some connections in between them to follow a more general principle but will differ from step to step or from loop pass to loop pass as the audio data changes from loop pass to loop pass.

In one aspect the invention may provide a method of processing first audio data comprising:
  transforming the first audio data using a first transformation generating time-frequency domain audio representation data, especially spectrogram data, having a first magnitude and first phase data and using the first magnitude and first phase data as a first iterated magnitude and first iterated phase data;
  iteratively changing the transformed first audio data by looping the following steps:
    modifying the first iterated magnitude and first iterated phase data to obtain modified magnitude and modified phase data;
    at least in every 5$^{th}$ loop pass performing the following steps:
      retransforming the modified magnitude and modified phase data to generate complex data;
      calculating more real data from the complex data;
      transforming the more real data to generate second phase data and using a combination of the modified magnitude and second phase data with the first magnitude and first phase data as new iterated magnitude and new iterated phase data or
      using a combination of the more real data with a transformation of the first magnitude and first phase data as new data and transforming the new data generating new iterated magnitude and new iterated phase data and in every other loop pass using a combination of the modified magnitude and modified phase data with the first magnitude and first phase data as new iterated magnitude and iterated phase data
c. retransforming the iterated magnitude and iterated phase data to generate modified audio data.

In another aspect, the invention may provide an audio processing device comprising at least one processor; and at least one memory; wherein the memory stores parts or blocks of or complete first audio data; and wherein the device is programmed to perform the processing of the first audio data according to method set out above using the at least one processor to perform the steps a to c.

In yet another aspect, the invention may provide a method of processing first audio data, comprising providing an audio processing device including at least one processor and at least one memory; wherein the at least one processor is programmed to perform an algorithm that processes first audio data and improves the quality of audio data modification or gives the audio data a more realistic or natural sound; the algorithm including transforming the audio data in the audio processing device through a series of loop passes; while at least in every 5$^{th}$ loop pass the audio data is changed to become more real.

The principle of this invention ensures that the modified audio data is more real or more realistic than without applying the invention. This is achieved by removing or reducing the amount or part of imaginaries values or imaginary parts of complex values representing the audio data, especially when transferred back to time domain.

BRIEF DESCRIPTION OF THE SEVERAL VIEWS OF THE DRAWINGS

In the following the invention shall be described further but without any limitation on the scope by use of the drawings that are only schematic and show.

DETAILED DESCRIPTION

In one aspect, the invention may comprise an audio processing device that includes at least one processor and at least one memory to store first audio data. The audio processing device may be arranged and specially programmed to modify and transform the first audio data in accordance with the method set out in the flow chart of FIG. 7. The steps of the method shown in FIG. 7, particularly the transformations and modifications, may be performed using at least one specially programmed processor in the audio processing device. The audio processing device may further comprise means for recording audio and/or generating or modifying audio data and may therefore include a microphone and/or a digitization means, like a sound card, to digitize the microphone's signal.

Figure 7:
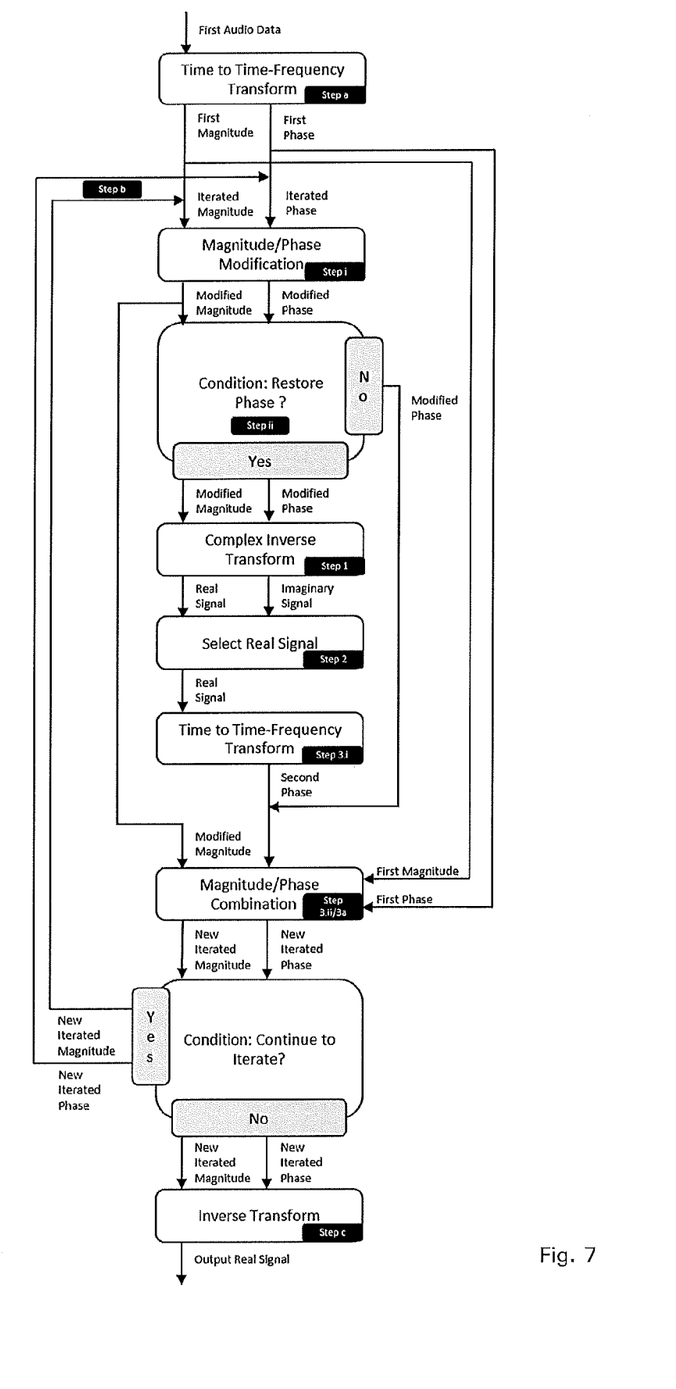
FIG. 7 schematic representation of the steps of the invention.

In another aspect, the invention may comprise a server having at least one processor and at least one memory and means for receiving or recording digital audio data as first audio data; wherein the at least one processor and at least one memory is specially configured and programmed to store the first audio data or parts or blocks of the first audio data and/or the processor is specially configured and programmed to perform the method illustrated in the flow chart of FIG. 7 on the first audio data. The means for receiving might comprise an interface to receive audio data, e.g. Steinberg interfaces, e.g. one or more of the UR Series (UR12, UR22mkll, UR242, UR44, UR28M, UR824), especially via the Internet or Ethernet, e.g. Dante Networks, especially Dante Interface and/or a web-based interface for example a webpage to upload the first audio data.

It is further preferred to include the step of acquiring the first audio data by digitalization of a sound, which, for example, could be performed by recording the sound, for example with a microphone, and digitization of the recording. Alternatively, it is preferred to acquire the first audio data by processing or modifying audio data, for example generated by a synthesizer or by acquiring a natural sound, for example by digitizing the recording of a sound.

Figure 1:
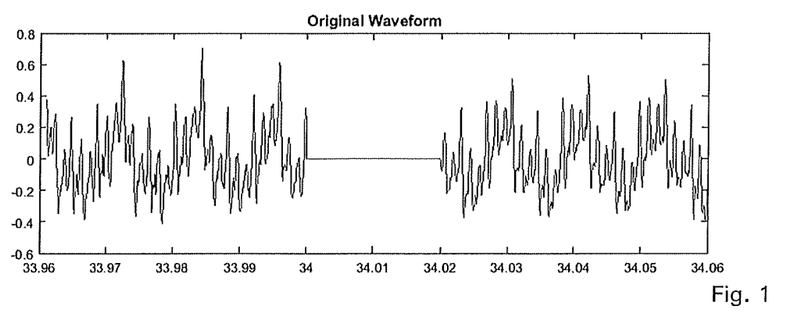
FIG. 1 a representation of audio data in waveform with a dropout.
Figure 3:
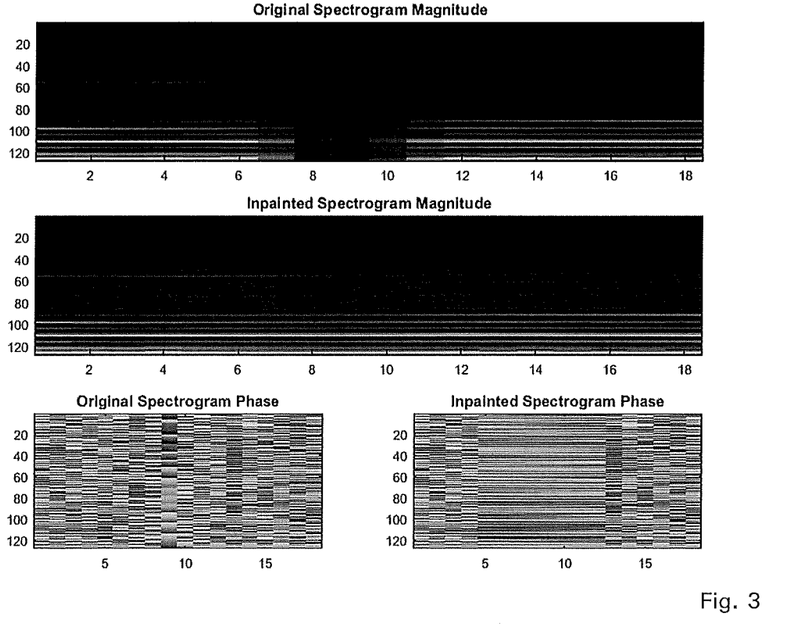
FIG. 3 spectrograms of the audio data of FIG. 1 and FIG. 2.

FIG. 1 shows a waveform representation of the song "Michelle" from the Beatles (Original CD Version) in Mono 44100 Hz/16 bit, the time range is between 33.961 and 34.060 seconds, the drop out (flat horizontal line) of 20 ms starts at 34.000. The spectrogram generated by a Short Time Fourier Transform (transformation to time-frequency domain) with a Hamming window of 1024 samples and a hop of 256 samples is shown in FIG. 3 as original spectrogram magnitude and original spectrogram phase. The complex spectrogram has been divided in Magnitude and Phase spectrograms that are depicted in FIG. 3. The Magnitude spectrograms correspond to absolute value of the complex data and the Phase spectrograms correspond to angle value of the complex data. One Magnitude and one Phase spectrogram together correspond to complex data.

Audio data in the time domain is represented with real numbers while the spectrum of audio data as well as time frequency domain audio data is represented with complex numbers (because the spectrum includes both a magnitude component and a phase component).

Then, to show the effect of the invention and with reference to FIG. 7, the spectrogram data has been first processed by the following process, corresponding, together with the described transformation, to processing first audio data by the following steps:

a. transforming the first audio data, especially time-domain audio data, using a first transformation generating time-frequency domain audio representation data, especially spectrogram data, having first magnitude and first phase data and using first magnitude and first phase data as first iterated magnitude and first iterated phase data are initialized to first magnitude and first phase data b. iteratively changing the data by looping the following steps:
  i. modifying the iterated magnitude and phase data to obtain modified magnitude and phase data
  ii.3a. using a combination of the modified magnitude and phase data with the first magnitude and phase data as new iterated magnitude and phase data c. retransforming the iterated magnitude and phase data to generate modified audio data.

The iterative process of projected regularization (step b.i) and combination (Step b.ii.3a) is processed in both spectrograms. After several iterations, an Inverse Fourier Transform of the magnitude/phase spectrogram is processed in order to recover audio data. Other transforms such as Constant-Q Transform are also possible to convert between time domain and time-frequency domain.

The modification or regularization used in step b.i. (FIG. 7) is derived from the physical Model Fourier Heat Equation such as:

$$\frac{dI}{dt} - \alpha\left(\frac{d^2I}{dx^2} + \frac{d^2I}{dy^2} + \frac{d^2I}{dz^2}\right) = 0$$

It was modified to make the model anisotropic by introducing a second thermal diffusivity coefficient, and applied to the special 2-dimension case:

$$\frac{dI}{dt} - \alpha\frac{d^2I}{dx^2} - \beta\frac{d^2I}{dy^2} = 0$$

According to the Taylor formula, this develops to the following approximation:

$$I(x+h, y+l) =$$

$$I(x, y) + h*\frac{dI}{dx} + l*\frac{dI}{dy} + \frac{h^2}{2}*\frac{d^2I}{dx^2} + \frac{l^2}{2} + \frac{d^2I}{dy^2} + h*l*\frac{d^2I}{dx*dy}$$

By injecting using the four following values of (h,l)=(1, 0); (−1,0); (0,1); (0,−1) and injecting it into the anisotropic model, one obtains:

$$I(x, y, t+1) - I(x, y, t) = \alpha * (I(x+1, y, t) + I(x-1, y, t) - 2*I(x, y, t)) +$$
$$\beta * (I(x, y+1, t) + I(x, y-1, t) - 2*I(x, y, t))$$

This is equivalent to the following matrix operation:

$$I(t+1) = I(t) \otimes K$$

$$\text{with } K = \begin{pmatrix} 0 & \beta & 0 \\ \alpha & -2*\alpha - 2 + \beta & \alpha \\ 0 & \beta & 0 \end{pmatrix}$$

K is a tensor function or convolution kernel that is used in every loop pass. One could, by entering different values for α and β, generate a tensor field for each loop pass, having a tensor for each data point.

Each iteration of this (modified) physical model will generate modified magnitude data (modified magnitude spectrogram) and modified phase data (modified phase spectrogram) using the same regularization or modification process once on the magnitude data (magnitude spectrogram) and once on the phase data (phase spectrogram).

This modified magnitude data and modified phase data is combined with the first magnitude and first phase data as new iterated magnitude and phase data by the use of a binary mask here. The area covering the dropout is fully inpainted/reconstructed by the use of the first magnitude and first phase data outside the dropout and use of modified magnitude data and modified phase data inside the dropout as combination (step b.ii.3a—FIG. 7) generating new iterated magnitude and phase data.

Figure 2:
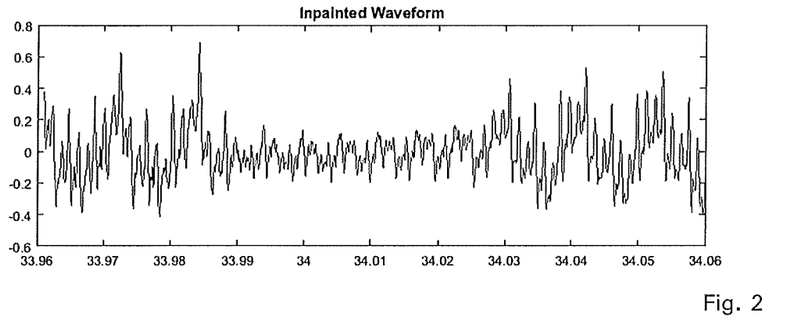
FIG. 2 a representation of audio data in waveform with a reconstruction of the dropout.

The new iterated magnitude and phase data is used for the next loop pass or iteration. 200 loop passes (of steps b.i and b.ii.3a—FIG. 7) were performed. At the end of the looping the (last) new iterated magnitude and phase data is retransformed (step c—FIG. 7) to the time domain using the inverse of the first transformation used in step a of FIG. 7. A waveform representation of this modified audio data is shown in FIG. 2.

FIG. 3 shows the result of the last loop pass, the last new first modified magnitude and phase data as "Inpainted magnitude spectrogram" and "Inpainted phase spectrogram".

To these spectrograms the metric known as STFT consistency (equation 3 from paragraph 6.1. of Nicolas Sturmel, Laurent Daudet, "signal reconstruction from as STFT magnitude: a state of the art", see above) was applied by summing the magnitudes of the elements of the obtained matrix, resulting in an acceptable metric value of 2700.

This metric provides a measurement to examine the consistency of STFT converted audio data or how natural and/or realistic an audio playback of audio data will sound. The smaller the metric value, the better is the consistency.

Figure 4:
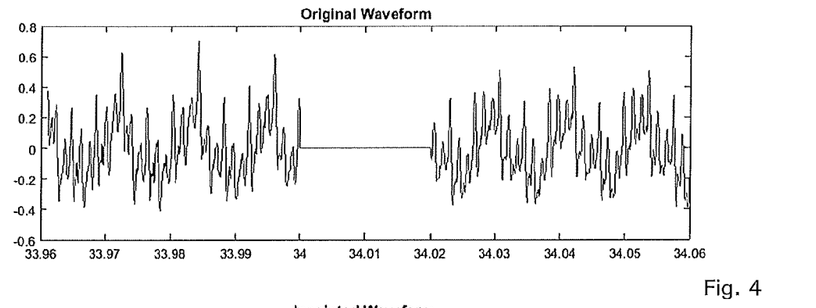
FIG. 4 a representation of the audio data of FIG. 1 in waveform (with a dropout)
Figure 5:
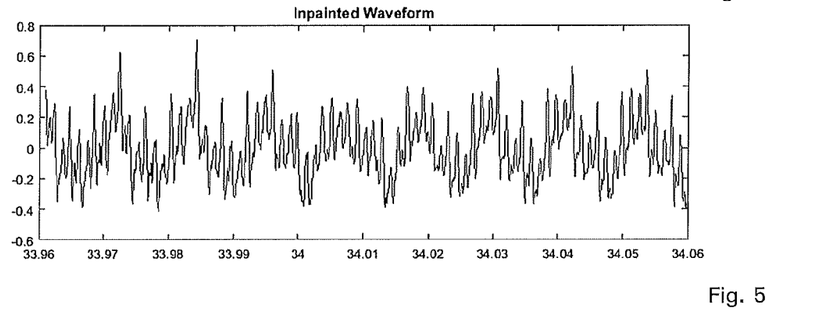
FIG. 5 a representation of audio data in waveform with a reconstruction of the dropout according to the invention.

Nearly the same process as described above was applied to the same first audio data with the only difference that the inventive steps 1 to 3 (FIG. 7) were performed instead of step 3a in every of the 200 loop passes (now steps b.i, b.ii.1, b.ii.2 and b.ii.3 in every loop pass—FIG. 7). This was done using the same transformation in step 3 as in step a and the same retransformation in step 1 as in step c. Step 2 was performed by stripping away any imaginary part. The waveform representation of the first audio data is again shown in FIG. 4 (same as FIG. 1) while the waveform representation of the modified audio data is shown in FIG. 5.

Figure 6:
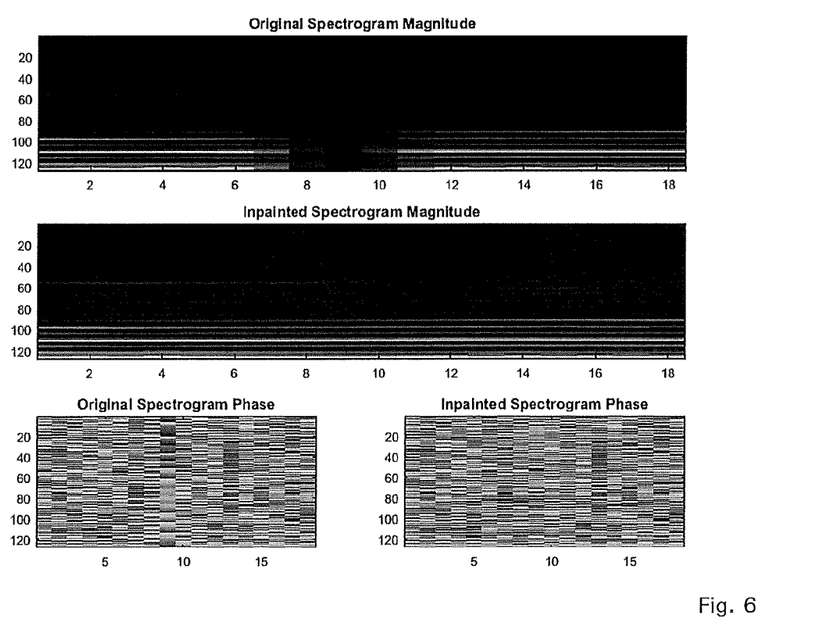
FIG. 6 spectrograms of the audio data FIG. 3 and FIG. 4.

Spectrograms of the first magnitude and phase data are shown in FIG. 6 as original magnitude spectrogram and original phase spectrogram while the representations of last new iterated magnitude and phase data are shown as "Inpainted magnitude spectrogram" and "Inpainted phase spectrogram".

Applying the same metric as before to this last new iterated magnitude and phase data results in a metric value of 490.

Generating of the second phase data used inside the in-painting process might be summarized as :angle(STFT(real(iSTFT(complexSpectrogram))))

FIG. 7 shows an exemplary flow chart of the inventive method that can for example be implemented in a software program based on this flow chart which can be used to specially program a computer, server or a CPU to execute the program. At the top of the flowchart first audio data is supplied to the process and, in step a, transformed from time domain to time frequency domain. As example time domain audio data is supplied and therefore the first audio data is transformed from time domain to time frequency domain, for example using STFT transformation. Therefore FIG. 7 denotes this step as Time to time-frequency transform. In general this step is constituted by a transformation from the domain of the first audio data to time-frequency domain. This generates time-frequency domain audio representation data, having first magnitude data and first phase data. The time-frequency domain audio representation data is the same as transformed first audio data. It should be noted that in some instances in FIG. 7 the word "data" is omitted for clarity of illustration. So for example the term "first magnitude" refers to "first magnitude data".

For step b, to iteratively changing the transformed first audio, first magnitude data and first phase data will be initialized to iterated magnitude data and iterated phase data for the start of the looping. Magnitude data and phase data together are complex data, e.g. first complex data consists of first magnitude data and first phase data. Step i and step ii are substeps of step b. Iterated magnitude data and iterated phase data will be modified in step i. This will generate modified magnitude data and modified phase data. Within step ii., a decision is taken whether to perform the phase restoration steps 1 to 3 or to skip them and instead use step 3a; all being substeps of step ii. One loop pass includes the steps b.i and b.ii, including b.ii.1, b.ii.2 and b.ii.3 or b.ii.3a.

At least every fifth loop pass steps 1 to 3 are performed. Whether steps 1 to 3 or step 3a is/are performed is decided in the "condition: restore phase?" decision module. At least every $5^{th}$ loop pass the decision is yes. But the decision might include further aspects like the quality of data or changes performed during the last yes-decision, or specify any other relation of yes:no smaller than 5:1. When performing steps 1 to 3 (after a yes-decision), a retransformation or complex inverse transform is performed on the modified magnitude data and modified phase data to generate the complex audio data, especially real signal data and an imaginary signal data (in FIG. 7 called real signal and imaginary signal).

In step 2 the signal or data is made more real, in this example the imaginary part is stripped away in step 2. As the imaginary part is just stripped away in this example the step is denoted as "select real signal" which is a special way of calculating more real data. The more real data, in this example only the real signal data is used in step 3, in FIG. 7 in step 3.i. FIG. 7 shows step 3 divided in subsubsteps 3.i and 3.ii for better graphical representation as step 3.ii corresponds to step 3a. When transferring the data from time domain to time frequency domain in step 3.i by the transformation, for example a STFT transformation the more real data is used. In step 3.ii a combination of first magnitude and first phase data on one hand and modified magnitude and second phase on the other hand is generated, for example by use of a binary mask and the result is used as new iterated magnitude and new iterated phase data for the next loop pass or the processing in step c.

If phase restoration steps 1 to 3 are not performed in a loop pass, step 3a is performed (after a no-decision in the "condition: phase restore? Condition" module) instead to generate new iterated magnitude data and new iterated phase data by combining first magnitude and first phase data with modified magnitude and modified phase data, for example by use of a binary mask.

If the looping is finished is decided in the "Condition: Continue to Iterate?" module. This decision can be based on various aspects, e.g. it can just take into account the number of loop passes and take a yes-decision as long as the number of loop passes is not reached and a no-decision if the number is reached.

When the looping continued (yes-decision in the "Condition: Continue to Iterate?" module) the last new iterated magnitude and last new iterated phase data (result of step 3.ii or 3a), those from the last loop pass just finished, are used in step b for the next loop pass as new iterated magnitude and new iterated phase data to going on with iteratively changing the transformed first audio data.

When the looping is finished (no-decision in the "Condition: Continue to Iterate?" module) the last new iterated magnitude and last new iterated phase data (result of step 3.ii or 3a), those from the last loop pass just finished, are used in step c to generate modified audio data by transforming the last new iterated magnitude and last new iterated phase data, especially into time domain (inverse Transform). The modified audio data can be used to generate a real output signal, for example a playback of the modified audio data.

This method can be implemented e.g. using the following Matlab® code. Not defined variables are constants that can be initialized by a person skilled in the art and might differ depending on the first audio data to process and the desired outcome. The numbering in the comments relates to the claimed features and the comments relate to the naming of FIG. 7. The "outputRealSignal" at the end of the code relates top the modified audio data.

```
function [ outputRealSignal ] = InpaintingAlgo( firstAudioData, fs, inpaintingMask )
    %% Step a - Time to Time-Frequency Transform
    firstSpectrogram = stft(firstAudioData, wlen, hop, wlen, fs);
    firstMagnitude=abs(firstSpectrogram).*abs(1-inpaintingMask);
    firstPhase=angle(firstSpectrogram).*abs(1-inpaintingMask);
    %% Initialize Iteration
    iteratedMagnitude=firstMagnitude;
    iteratedPhase=firstPhase;
    % Generate Convolution Kernel
    convolutionKernel=[0 blurFrequency 0;
                blurTime (-2*blurTime-2*blurFrequency) blurTime;
                0 blurFrequency 0];
    % Iterate by looping
    for ite=1:iterations
        %% Step b.i - Magnitude/Phase Modification
        modifiedMagnitude=iteratedMagnitude+speedValue*conv2(iteratedMagnitude, convolutionKernel,'same');
        modifiedPhase=iteratedPhase+speedValue*conv2(iteratedPhase, convolutionKernel,'same');
        % Step b.ii - Condition: Restore Phase?
        if restorePhase
            % Step b.ii.1 - Complex Inverse Transform
            [complexSignal, ~] = istft(modifiedMagnitude.*exp(1i*modifiedPhase), hop, wlen, fs);
            % Step b.ii.2 - Select Real Signal
            realSignal=real(complexSignal);
            % Step b.ii.3.i - Time to Time-Frequency Transform
            [secondSpectrogram, ~, ~] = stft(realSignal, wlen, hop, wlen, fs);
            secondPhase=angle(secondSpectrogram);
        else
            %% Step b.ii.3a
            secondPhase=modifiedPhase;
        end
        %% Step b.ii.3.ii/b.ii.3a(continued) - Magnitude/Phase Combination
        newIteratedMagnitude=firstMagnitude+(inpaintingMask.*modifiedMagnitude);
        newIteratedPhase=firstPhase+(inpaintingMask.*secondPhase);
        iteratedMagnitude=newIteratedMagnitude;
        iteratedPhase=newIteratedPhase;
    end
    %% Step c - Inverse Transform
    outputRealSignal = istft(iteratedMagnitude.*exp(1i*iteratedPhase), hop, wlen, fs);
end
```

The stft and the istft are defined by the Short-Time Fourier Transformation and inverse -continued Short-Time Fourier Transformation by Hristo Zhivomirov of August 5, 2015 to be found at the German website of:
mathworks.com/matlabcentral/fileexchange/45577-inverse-short-time-fourier-transformation--istft--with-matlab-implementation.
Copyright (c) 2015, Hristo Zhivomirov - All rights reserved.
Redistribution and use in source and binary forms, with or without modification, are permitted provided that the following conditions are met:
  * Redistributions of source code must retain the above copyright notice, this list of conditions and the following disclaimer.
  * Redistributions in binary form must reproduce the above copyright notice, this list of conditions and the following disclaimer in the documentation and/or other materials provided with the distribution THIS SOFTWARE IS PROVIDED BY THE COPYRIGHT HOLDERS AND CONTRIBUTORS "AS IS" AND ANY EXPRESS OR IMPLIED WARRANTIES, INCLUDING, BUT NOT LIMITED TO, THE IMPLIED WARRANTIES OF MERCHANTABILITY AND FITNESS FOR A PARTICULAR PURPOSE ARE DISCLAIMED. IN NO EVENT SHALL THE COPYRIGHT OWNER OR CONTRIBUTORS BE LIABLE FOR ANY DIRECT, INDIRECT, INCIDENTAL, SPECIAL, EXEMPLARY, OR CONSEQUENTIAL DAMAGES (INCLUDING, BUT NOT LIMITED TO, PROCUREMENT OF SUBSTITUTE GOODS OR SERVICES; LOSS OF USE, DATA, OR PROFITS; OR BUSINESS INTERRUPTION) HOWEVER CAUSED AND ON ANY THEORY OF LIABILITY, WHETHER IN CONTRACT, STRICT LIABILITY, OR TORT (INCLUDING NEGLIGENCE OR OTHERWISE) ARISING IN ANY WAY OUT OF THE USE OF THIS SOFTWARE, EVEN IF ADVISED OF THE POSSIBILITY OF SUCH DAMAGE.

```
istft.m:
xlen = nfft + (coln−1)*h;
x = zeros(1, xlen);
% form a periodic hamming window
win = hamming(nfft, 'periodic');
% perform IFFT and weighted-OLA
if rem(nfft, 2)              % odd nfft excludes Nyquist point
   for b = 0:h:(h*(coln−1))
      % extract FFT points
      X = stft(:, 1 + b/h);
      X = [X; conj(X(end:−1:2))];
      % IFFT
      xprim = real(ifft(X));
      % weighted-OLA
      x((b+1):(b+nfft)) = x((b+1):(b+nfft)) + (xprim.*win)';
   end
else                         % even nfft includes Nyquist point
   for b = 0:h:(h*(coln−1))
      % extract FFT points
      X = stft(:, 1+b/h);
      X = [X; conj(X(end−1:−1:2))];
      % IFFT
      xprim = real(ifft(X));
      % weighted-OLA
      x((b+1):(b+nfft)) = x((b+1):(b+nfft)) + (xprim.*win)';
   end
end
W0 = sum(win.^2);            % find W0
x = x.*h/W0;                 % scale the weighted-OLA
% calculate the time vector
actxlen = length(x);         % find actual length of the signal
t = (0:actxlen−1)/fs;        % generate time vector
end
-------------------------------------------------------------------------------------------------------------
stft.m:
% represent x as column-vector if it is not
if size(x, 2) > 1
   x = x';
end
% length of the signal
xlen = length(x);
% form a periodic hamming window
win = hamming(wlen, 'periodic');
% form the stft matrix
rown = ceil((1+nfft)/2);        % calculate the total number of rows
coln = 1+fix((xlen−wlen)/h);    % calculate the total number of columns
stft = zeros(rown, coln);       % form the stft matrix
% initialize the indexes
indx = 0;
```

```
col = 1;
% perform STFT
while indx + wlen <= xlen
   % windowing
   xw = x(indx+1:indx+wlen).*win;
   % FFT
   X = fft(xw, nfft);
   % update the stft matrix
   stft(:, col) = X(1:rown);
   % update the indexes
   indx = indx + h;
   col = col + 1;
end
% calculate the time and frequency vectors
t = (wlen/2:h:wlen/2+(coln−1)*h)/fs;
f = (0:rown−1)*fs/nfft;
end
```
---
```
Resynthesis.m:
clear, clc, close all
% music program (stochastic non-stationary signal)
[x, fs] = wavread('track.wav');
x = x(:, 1);
xmax = max(abs(x));
x = x/xmax;
% signal parameters
xlen = length(x);
t = (0:xlen−1)/fs;
% define analysis and synthesis parameters
wlen = 1024;
h = wlen/4;
nfft = wlen;
% perform time-frequency analysis and resynthesis of the original signal
[stft, f, t_sfft] = stft(x, wlen, h, nfft, fs);
[x_istft, t_istft] = istft(stft, h, nfft, fs);
% plot the original signal
figure(1)
plot(t, x, 'b')
grid on
xlim([0 max(t)])
ylim([−1.1 1.1])
set(gca, 'FontName', 'Times New Roman', 'FontSize', 14)
xlabel('Time, s')
ylabel('Normalized amplitude')
title('Original and reconstructed signal')
% plot the resynthesized signal
hold on
plot(t_istft, x_istft, '-.r')
legend('Original signal', 'Reconstructed signal')
```
---
```
Windowchoice.m:
clear, clc, close all
wlen = 64;              % window length (recomended to be power of 2), choose it!
h = wlen/4;             % hop size (recomended to be power of 2),    choose it!
k = 5*wlen;             % overlap-add span
win = hamming(wlen, 'periodic');   % window,                         choose it!
s = zeros(k, 1);
for k = 0:h:k−wlen
   indx = k+1:k+wlen;          % current window location
   s(indx) = s(indx) + win.^2;    % window overlap-add
   winp(indx) = win;           % for plot only
   plot(winp, 'ok')            % plot just this window
   hold on
end
W0 = sum(win.^2);           % find W0
s = h*s/W0;                 % scale the window overlap-add
stem(s, 'r');               % plot window overlap-add
```

The process in accordance with an aspect of the invention therefore includes transforming first audio data, especially time domain audio data, using a first transformation to generate time-frequency domain audio representation data, especially spectrogram data, having first magnitude and first phase data. First audio data can be generated by various methods. For example, natural sounds could be recorded using for example a microphone and the recording can be digitized to generate first audio data. First audio data could as well be generated by a synthesizer or by modifying audio data originated for example from a synthesizer or a digitized recording of sounds.

The transformation can be implemented in various ways. In general, it will be a mathematically defined process to convert the first audio data generating time-frequency domain audio representation data. This can be done, for example by the use of Short-Term Fourier Transformation or Constant-Q Transformation, for example known from Christian Schörkhuber, Anssi Klapuri, "Constant-Q Transformed Toolbox For Music Processing" Conference Paper from SMC Conference 2010 (2010), accessible via the website smcnetwork.org/files/proceedings/2010/48.pdf.

This, for example, generates spectrogram data that, in contrast to a spectrum, evolves over time. In general, the transformation will generate data having first magnitude and phase data which is the same as first magnitude data and first phase data. In many cases the magnitude data will be represented by the absolute value of a complex value while the phase data is represented by the angle of a complex value.

Starting from this first magnitude and phase data the invention changes the data by using an iterative process represented by a loop that will be passed many times and that, in each loop pass has steps of processing. The data changed might be the iterated audio data and/or the iterated magnitude and phase data initially defined as (copy of) the first audio data and/or the first magnitude and phase data and/or the time-frequency audio representation data while, in general, at least at the end of the processing modified audio data, especially in the time domain, is generated. In general, at the end of each loop pass new magnitude and/or phase data (e.g. named modified and/or second magnitude and/or modified phase and/or second phase data) is generated to be used as (new) iterated data (as surrogate for the first audio data), e.g. for the next loop pass or at the end of the loop for generating modified audio data.

It is preferred to initialize the first magnitude data and first phase data as iterated magnitude and iterated phase data. This means that the first magnitude data and first phase data are used as first iterated magnitude and first iterated phase data. The looping starts with the first magnitude data and first phase data as iterated magnitude and iterated phase data.

The steps of the iterative process in one and/or each loop pass, step b, include modifying the iterated magnitude and phase data or iterated magnitude and iterated phase data (which is the same) to obtain modified magnitude and phase data or modified magnitude data and modified phase data (which is the same). This modification can be performed in very many different ways for example such iterated modification is known from audio or image processing. Mostly the modification will be performed by applying at least one mathematically defined modification, convolution kernel and/or projection to the iterated magnitude and phase data. This modification can, for example, be performed directly on the iterated magnitude and phase data or include a transformation, modification and retransformation. Therefore, the actual modification can, for example, be performed in the time domain or time-frequency domain. In most cases the modification or modifying can be performed by the application of a regularization, matrix convolution with a convolution kernel or/and a projection defined e.g. by matrix, tensor, matrix field or tensor field.

Preferably step b, the iterative changing of the data, is repeated at least the n times, n being calculated by (pre-defined number, for example 8)×(time duration of the range to inpaint in second)×(audio Sample-Rate of the first audio data)/(Size of the fft hop in the transformation of the first audio data). While the range to inpaint is a time range of the first audio data that shall be modified, is modified by the process, reconstructed by the process and/or regularized by the process. Alternatively, it is preferred to choose n higher than 20, especially higher than 50. Alternatively, or in addition for stopping the iteration or the processing of step b or the looping there can be a predefined number of loop passes or some criteria can be defined which is used to decide whether another loop pass is performed or not. Such criteria could, for example, be some criteria related to the quality of the audio data, for example some metric used together with some kind of limit regarding this metric, while looping is ended when the limit is achieved first time. Such metric, for example, could be the one defined in paragraph 6.1 of Nicolas Sturmel, Laurent Daudet, "signal reconstruction from as STFT magnitude: a state of the art" (see above).

The invention includes to perform the steps of phase optimization at least every fifth loop pass. It is preferred to perform those steps (1 to 3) more often or more frequently, especially in every second or in every loop pass as this enhances the result further. But in some cases or when the quality of the result should be trade-in for less processing time it might be sufficient to perform the steps 1 to 3 less often, for example only every fifth loop pass. The loop to which the loop pass is referred to is the loop defined in step b.

But in most cases, when the quality of the results in terms of a most realistic audio experience shall be traded in for less calculation time it is advisable to not reduce the frequency of the phase optimization but to reduce the amount of loop passes. This might reduce the quality of the modification or restauration or in-painting but we ensure a realistic audio experience based on a playback of the modified audio data.

The steps defined in step 3a will only be performed when phase optimization is not used in a loop pass. In this loop passes steps 1 to 3 will not be performed. This means either steps 1 to 3 are performed or step 3a is performed in one loop pass. This results in step 3a not being performed at all if phase optimization is performed during every loop pass.

Phase optimization consists of the steps 1 to 3 which include retransforming the modified magnitude and phase data or modified magnitude and modified phase data to generate complex data, especially complex time-domain data.

The retransformation can be implemented in various ways. In general, it will be a mathematically defined process to convert the modified magnitude and phase data generating new data, especially complex time-domain data. This can be done, for example, by the use of Short-Term Fourier Transformation or Constant-Q Transformation. It is preferred to use a retransformation that is the inverse of the transformation used in step a for transforming the first audio data.

Based on that complex data, which is preferably time domain data, more real data is calculated.

Audio data is made more real when the digital signal is caused to more closely approximate a real number. In other words, data is more real when its real part is, compared to the complete complex value, greater than before. Audio data may be made more real in many ways such as by cancelling the non-real part, especially the imaginary part, of the complex data. Reducing the imaginary part of the complex data (instead of canceling the imaginary part) will also make the audio data more real. The imaginary part is reduced when the absolute value of the imaginary part is reduced.

It is preferred to calculate based on the complex data, which is preferably time domain data, real data in step 2 having no imaginary part but only a real part.

In one alternative the (more) real data is then transformed to generate second phase data, especially second phase data in time-frequency domain. Here again the transformation can be implemented in various ways. In general, it will be a mathematically defined process to convert the real data generating second phase data, especially second phase data in time-frequency domain. This can be done, for example by the use of Short-Term Fourier Transformation or Constant-Q Transformation. It is preferred to use the same transformation as used in step a for transforming the first audio data.

It is preferred to perform step 3 into sub steps 3.i transforming the more real data generating second phase data, especially in the time-frequency domain and 3.ii using a combination of the modified magnitude and second phase data with the first magnitude and first phase data as new iterated magnitude and new iterated phase data. Based on the modified magnitude and second phase data a combination with the first magnitude and phase data is generated and used as new iterated magnitude and phase data. This means that the iterated magnitude and phase data is substituted by that combination with the first magnitude and phase and the new iterated magnitude and phase data is used for the next step which e.g. can be step b.i. in the next loop pass or step c. if the loop is ended.

The combination can be generated in many different ways normally there will be some kind of masking and/or projecting. For example, when the method is used to reconstruct a missing or corrupted part of the first audio data there will be one or more regions in the iterated audio data or in the iterated magnitude and phase data that shall be reconstructed. In this case it is especially preferred to use modified magnitude and second phase data of those regions and first magnitude and phase data from outside those regions, while in the border region of those regions use of both, modified magnitude and second phase data as well as first magnitude and phase data is preferred. Many different ways of combining modified magnitude and second phase data with the first magnitude and phase data to generate such a combination are possible. Different methods and/or projections can be used e.g. like binary masks, and/or transparency (alpha) masks.

In another alternative a combination of the more real data with a transformation of the first magnitude and first phase data is used as new data and the new data is transformed generating new iterated magnitude and new iterated phase data.

When the looping of step b is finished, step c is performed to retransfer the iterated magnitude and phase data to generate modified audio data. The iterated magnitude and phase data used here for the retransformation is the one generated in step b, especially the new iterated magnitude and phase data generated in step 3 or step 3a during the last loop pass of step b.

Retransforming can be implemented in various ways. In general, it will be a mathematically defined process to convert the new iterated magnitude and phase data generating modified audio data, especially in time-domain. This can be done, for example by the use of Short-Term Fourier Transformation or Constant-Q Transformation. It is preferred to use a retransformation that is the inverse of the transformation used in step a and/or b.ii.3.

It is preferred to use at least one modification, modification transform or convolution kernel for modifying the magnitude and phase data to obtain modified magnitude and phase data in step i. It is especially preferred to use a modification or convolution kernel that is defined by at least one partial differential equation. Furthermore, it is preferred to use a modification defined by at least one partial differential equation which is representing a diffusion of a physical model. Such models can, for example, be such regarding temperature in solid matter, liquids or gases or concentrations in liquids or gases. For example, the Fourier Heat Equations might be used. Other physical models are possible such as salt concentration in water, atmospheric pressure in a closed environment, and so on. They might be further modified, especially to be anisotropic.

Therefore, it is especially preferred to use partial differential equations representing a diffusion of a physical model, but being modified to be anisotropic.

It is further or alternatively preferred to use a modification defined by at least one tensor or by at least one tensor field. It is further preferred that the at least one tensor or at least one tensor field is defined by an, especially consecutive, iteration step of a gradient algorithm, the gradient algorithm being one minimizing a functional defined over the first audio data or the iterated magnitude and phase data. Such a tensor or tensor field could be a tensor function or could include a tensor for each data point of the iterated magnitude and phase data.

Alternatively, or even further it is preferred to perform the modifying of the iterated magnitude and phase data in step b.i by applying an, especially consecutive, iteration step of a gradient algorithm, the gradient algorithm being one minimizing a functional defined over the first audio data or iterated magnitude and phase data. The functional could be a metric.

In general, it is preferred to perform the modifying of the iterated magnitude and phase data in step b.i anisotropically.

It should be understood that the following terms "Imaginary Signal", "imaginary value", "imaginary part" and "imaginary data" should be considered to be interchangeable; and that the terms "Real Signal", "real value", "real part" and "real data" should be considered to be interchangeable.

What is claimed is:

1. A method of processing first audio data comprising:
   providing an audio processing device having a processor, a memory; and
   programming in the processor to process audio data;
   providing first audio data to the audio processing device;
   a. transforming the first audio data by the processor using a first transformation; generating time-frequency domain audio representation data, especially spectrogram data, having a first magnitude and first phase data; and using the first magnitude and first phase data as a first iterated magnitude and first iterated phase data;
   b. iteratively changing the transformed first audio data by the processor by looping the following steps:
      i. modifying the first iterated magnitude and first iterated phase data by the processor to obtain modified magnitude and modified phase data;
      ii. at least in every $5^{th}$ loop pass performing the following steps:
         1. retransforming the modified magnitude and modified phase data by the processor to generate complex data;
         2. calculating more real data from the complex data by the processor, wherein the more real data is audio data that is perceivable by a human ear to be closer to a naturally occurring sound than to a computer-generated sound; or
         calculating more real data by the processor from the complex data by reducing the imaginary part;
         3. transforming the more real data by the processor to generate second phase data and using a combination of the modified magnitude and second phase data with the first magnitude and first phase data as new iterated magnitude and new iterated phase data or
 using a combination of the more real data with a transformation of the first magnitude and first phase data as new data and transforming the new data generating new iterated magnitude and new iterated phase data by the processor;
and in every other loop pass
  3a. using a combination of the modified magnitude and modified phase data with the first magnitude and first phase data as new iterated magnitude and iterated phase data in the processor; and
 c. retransforming the iterated magnitude and iterated phase data by the processor to generate modified audio data.

2. The method according to claim 1, wherein steps 1 to 3 are at least performed in every second processing of the looping steps i and ii by the processor.

3. The method according to claim 1, wherein steps 1 to 3 are performed in every processing one of the looping steps i and ii by the processor and wherein step 3a is not performed in every one of the looping steps.

4. The method according to claim 1, wherein the first transformation is used for transforming in step 3.

5. The method according to claim 1, wherein the first transformation is a short-time Fourier transform (STFT) or a Constant-Q Transform.

6. The method according to claim 1, wherein retransforming in step 1 or step c is performed by an inverse of the first transformation.

7. The method according to claim 1, wherein calculating the more real data from the complex data in step 2 is performed by discarding the imaginary part of the complex data using the programming in the processor.

8. The method according to claim 1, wherein modifying the magnitude and phase data by the processor to obtain modified magnitude and phase data in step i is performed using a modification, especially defined by at least one partial differential equation, especially such representing a diffusion of a physical model, or especially defined by at least one tensor or by at least one tensor field or especially defined by an, especially consecutive, iteration step of a gradient algorithm, the gradient algorithm being one minimizing a functional defined over the first audio data or the iterated magnitude and phase data.

9. The method according to claim 8, wherein each of the at least one tensor field is constituted by one tensor function or each tensor is constituted by one tensor function or a convolution kernel.

10. The method according to claim 1, wherein each modifying of the iterated magnitude and phase data by the processor to obtain modified magnitude and phase data in step i is performed by applying an, especially consecutive, iteration step of a gradient algorithm, the gradient algorithm being one minimizing a functional defined over the first audio data or iterated magnitude and phase data.

11. The method according to claim 8, wherein the modification is anisotropic.

12. The method according to claim 1, wherein step 3 includes using the processor to project the modified magnitude and second phase data on the first audio data or iterated magnitude and phase data or to mask the modified magnitude and second phase data, especially by a projection using a binary mask or a transparency (alpha) mask, especially in time domain or time-frequency domain or wherein step 3a includes using the processor to project the modified magnitude and phase data on the first audio data or iterated magnitude and phase data or to mask the modified magnitude and phase data, especially by a projection using a binary mask or a transparency (alpha) mask, especially in time domain or time-frequency domain.

13. The method according to claim 1, further comprising acquiring the first audio data by digitalization of a sound using the processor.

14. The method according to claim 1, further comprising acquiring the first audio data by processing or modifying audio data using the processor.

15. The method according to claim 1, wherein first audio data is time-domain audio data.

16. The method according to claim 1, wherein in step b.ii.1 retransforming the modified magnitude and modified phase data using the processor to generate complex time-domain data.

17. The method according to claim 1, wherein in step b.ii.3 transforming the more real data generates second phase data in the time-frequency domain.

18. An audio processing device comprising:
 at least one processor; and
 at least one memory; wherein the memory stores parts or blocks of or complete first audio data; and wherein the device is programmed to perform the processing of the first audio data according to claim 1 using the at least one processor to perform the steps a to c.

* * * * *